UNITED STATES PATENT OFFICE.

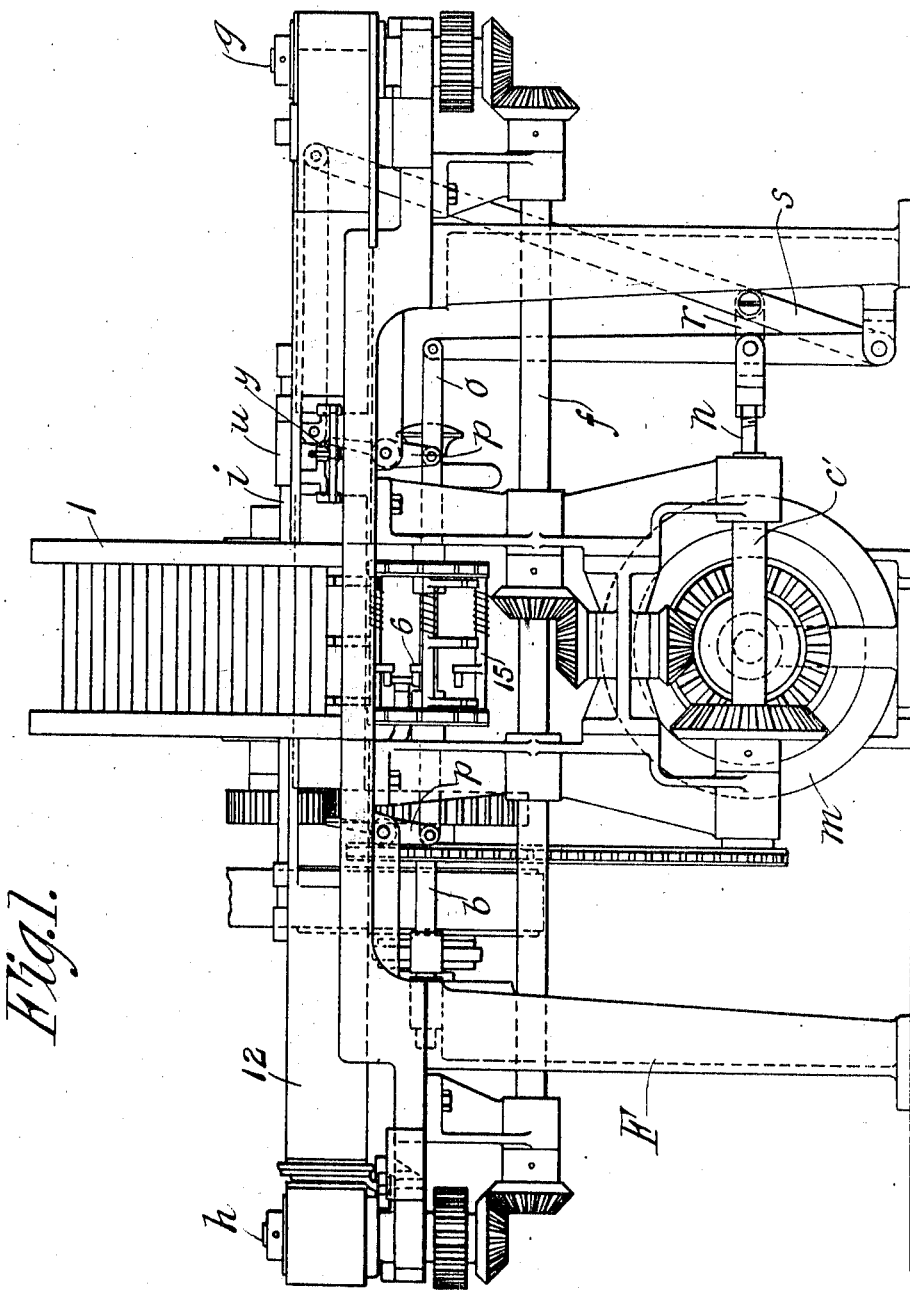

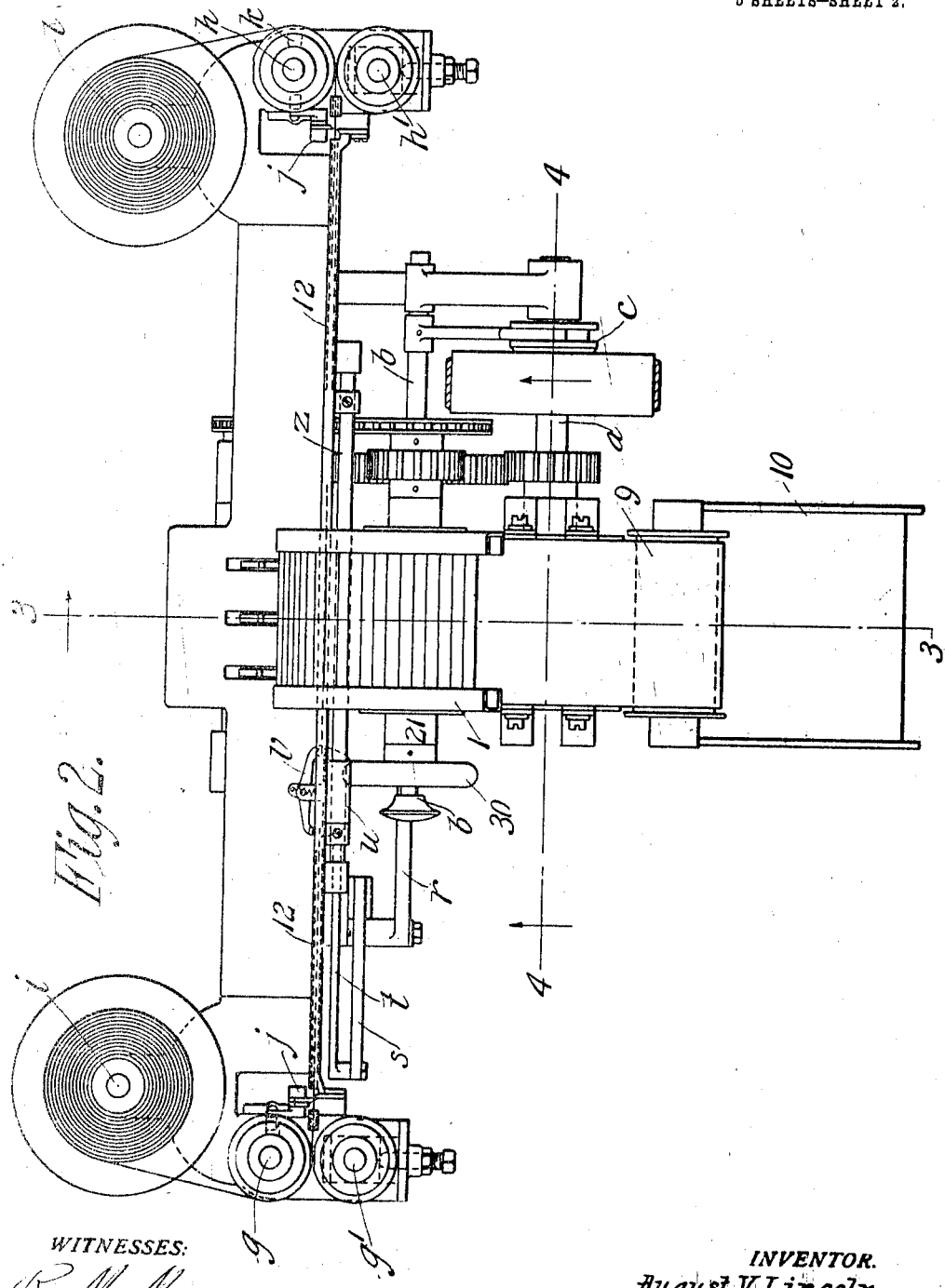

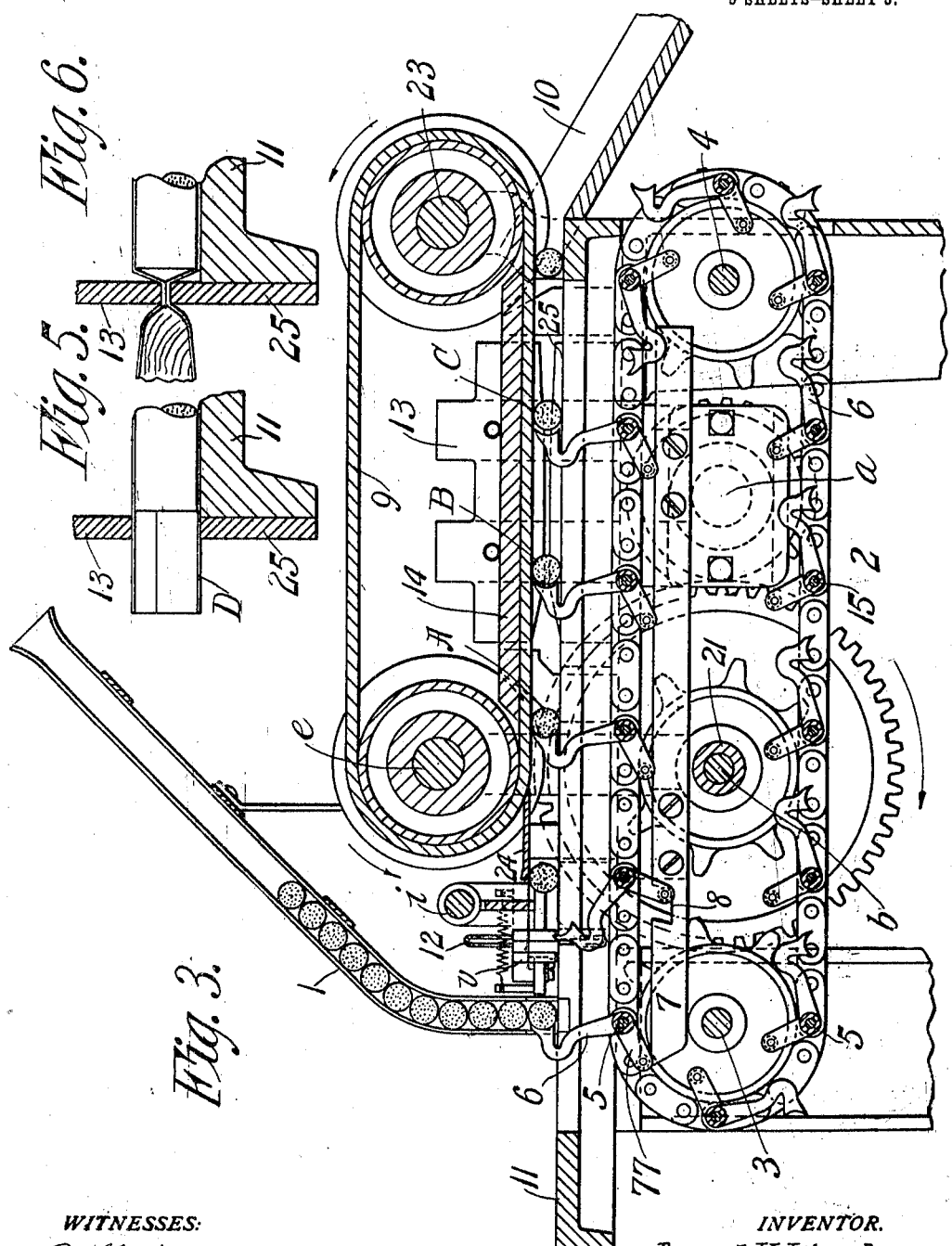

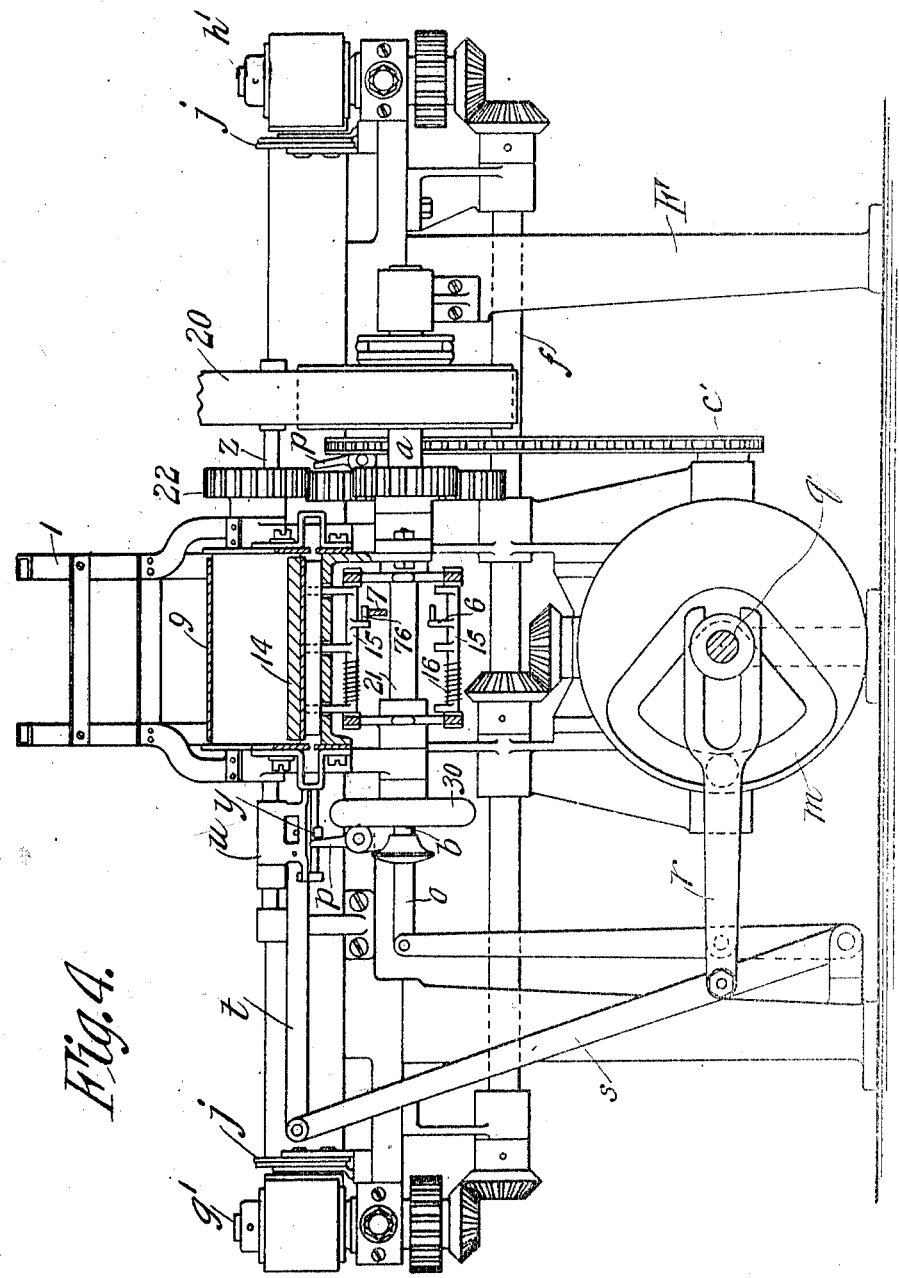

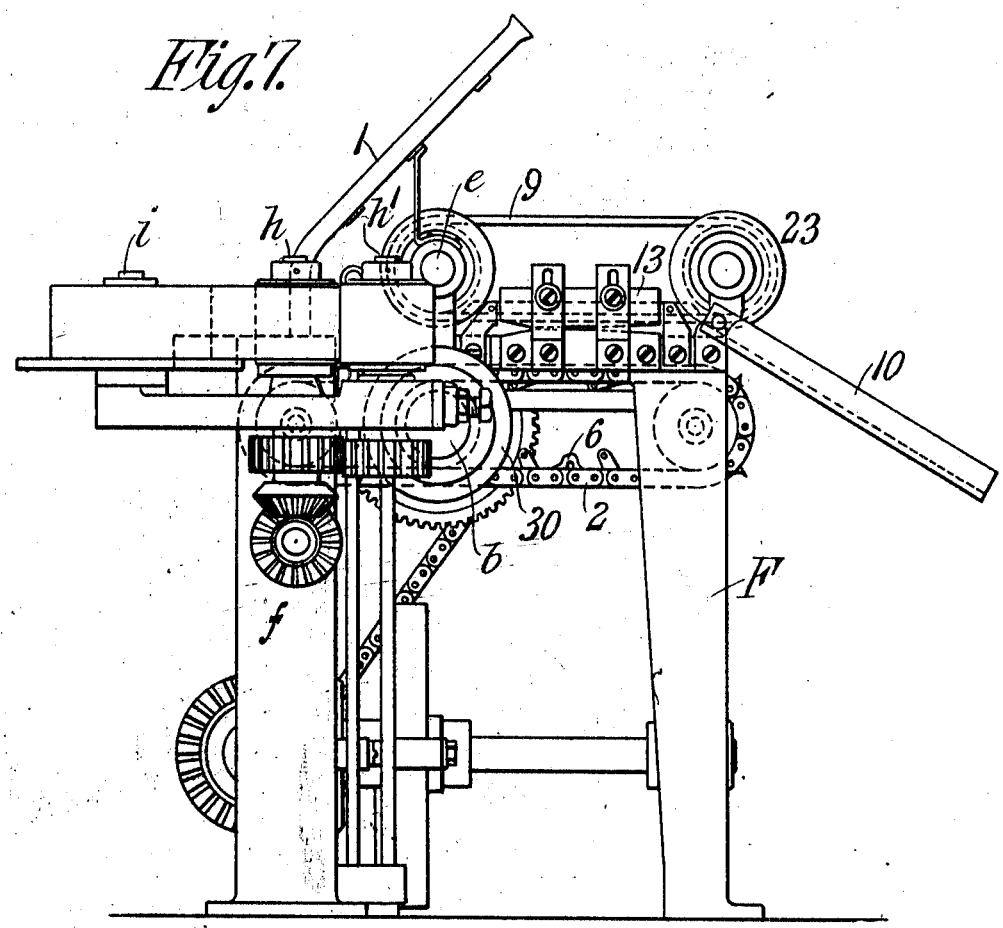
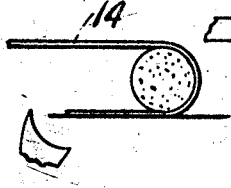 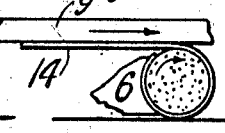  
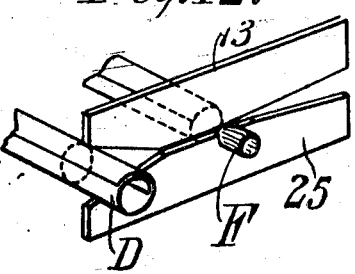

AUGUST V. LINCOLN, OF SPRINGFIELD, MASSACHUSETTS, ASSIGNOR OF ONE-HALF TO GEORGE D. CROSS, OF NEW YORK, N. Y.

WRAPPING-MACHINE.

1,096,546.  Specification of Letters Patent.  Patented May 12, 1914.

Application filed November 15, 1912. Serial No. 731,465.

*To all whom it may concern:*

Be it known that I, AUGUST V. LINCOLN, a citizen of the United States of America, residing at Springfield, in the county of Hampden and State of Massachusetts, have invented new and useful Improvements in Wrapping-Machines, of which the following is a specification.

This invention relates to a wrapping-machine, and particularly to a machine in which the wrapper is rolled around the article.

The invention in addition relates particularly to a wrapping-machine for wrapping articles where it is desired to have the ends of the wrapper twisted or crimped. This is commonly called "twist end wrapping" and has been very widely used in wrapping molasses kisses and like articles.

While the invention herein disclosed is adapted for wrapping articles of any nature in which the wrapper is rolled around the article which wrapper may when desired have its ends twisted or crimped, the specific embodiment of the invention chosen for the purposes of illustration relates particularly to a machine for wrapping stick candy and articles of that nature.

There are certain broad features of this invention which are not confined to the particular type of wrapping described as "twist end wrapping", but which can be generally used in the art of wrapping machines with advantageous results.

The object of the invention is to provide a machine which will, as far as possible, do away with moving parts and which will be continuous in operation, and, by avoiding separately-moving parts, do away with the vibration of the machine as a whole, which is troublesome in the ordinary wrapping machine.

Another object of the invention is to provide a machine in which the articles to be wrapped are successively carried through the machine in one continuous path without interruption, thereby causing a great saving in time and an increased capacity for the machine.

Another object of the invention is to provide mechanism operable to feed the articles through the machine in rapid movement and to cause the feeding movement to wrap the articles by the coöperation of suitable devices, preferably stationary, arranged along the path of the articles.

Another object of the invention is to provide a novel means for giving an end twist to the articles' wrapper without the ordinary operation of opening and closing end twisting jaws, where such twist is desired.

Another object of the invention is to provide a paper-feeding means which is particularly designed for use with the wrapping machine disclosed and which coöperates in an essential way with the operations of the wrapping machine.

A further object of the invention is to provide in a wrapping machine a wrapping channel, a part of which is movable to successively roll the wrappers around the articles and the articles through the channel, combined with feeding devices for the articles and wrappers operable to feed each article and its wrapper in proper position for passage through the channel, said feeding devices being arranged to pass through the channel in the rear of the article to insure its proper passage as well as to keep the channel clear for following articles.

These objects are attained by the mechanism hereinafter described as illustrative of the manner in which the invention can be specifically carried out.

With these objects in view, applicant, for the purpose of illustrating this invention, shows in the accompanying drawings a machine designed for wrapping stick-candy or similar articles.

In the drawings,—Figure 1 is a front elevation of the machine. Fig. 2 is a plan view thereof. Fig. 3 is a sectional view, taken on the line 3—3 of Fig. 2. Fig. 4 is a sectional view, taken on the line 4—4 of Fig. 2. Figs. 5 and 6 are detailed sectional views showing the operation of the end-twisting devices. Fig. 7 is an end elevation of the machine. Figs. 8, 9, 10, and 11 are detailed views showing the means for wrapping the article completely in one direction, whereby end extensions are left in the wrapper to be twisted against the ends of the article. Fig. 12 is a perspective view of the parts between which a slot is formed and through which slot the tubular end extensions of the several articles pass while rotating, which causes the extensions to turn into an end twist, as shown in this figure.

In order to wrap an article, such as a stick of candy, completely in one direction and leave tubular extensions in the wrapper, applicant has devised a continuous operating means which will carry the article from one end of the machine to the other, during a part of which operation the article is rotated with the wrapper and completely wrapped in one direction to leave tubular end extensions in the wrapper. The movement of the article will cause these end extensions to pass, while rotating, through a proper slot, suitably formed, on each side of the machine, and the drag of these slots as the article moves causes the ends to be crimped and twisted against the ends of the article so that when the article leaves the machine it will be completely wrapped. This means consists, essentially, of a belt operating parallel to a table or other suitable means, between which and the table the article, together with the wrapper, is fed. The movement of the belt rolls the article on the table and wraps its wrapper therearound.

Heretofore, in wrapping articles with a wrapper twisted at the ends, it has been customary to wrap the article completely in one direction so that tubular ends are left in the wrapper, extending from each end of the article. Open twisting jaws are first passed over the tubular ends of the wrapper and then closed over the wrapper, after which they are rotated, thus twisting the ends of the wrapper. In order to operate these jaws successfully, considerable mechanism is required. This type of mechanism is disclosed in patent to D. T. Igou, No. 833,785, dated October 23, 1906, and others. Applicant has made a radical departure from the accustomed means for twisting the ends of the wrapper. He has found that if an article is wrapped completely in one direction so that tubular ends are left in the wrapper, these tubular ends can be wedged in between a slot suitably formed by two parallel plates, wires, or other means, in substantially the same plane. When the tubular ends are thus wedged in the slot, which is of an appropriate width, either the article together with its wrapper, or the parts forming the slot, or both, can be rotated. Since the tubular end of the wrapper has been crimped and partly flattened out at an appropriate distance from the end of the wrapper, twisting either the article or the parts forming the slots, or both, will cause the end of the wrapper to twist in the same manner and with the same result as was obtained by the more complicated means of rotating jaws above mentioned. It is to be understood that the parts forming the slot in which the ends of the wrapper are to be wedged, allow the paper to slip therethrough as the twist is made, thus avoiding any tearing action, due to the taking up of the paper consequent on the twisting of the ends.

The invention in some particulars may be used without regard to the particular end twist or fold which may or may not be desired. A series of fingers on an endless movable chain is provided to feed each article and its wrapper successively into the wrapping channel in proper position for the channel to receive the article and completely roll the wrapper therearound. The fingers follow the article through the channel to insure its proper passage by keeping the article rolling straight and at the same time clear the channel for following articles. This is important where a wrapper or one of the articles, either of which may at times be imperfect, for any reason tends to clog the channel. The fingers are also designed to partially wrap the article as it is fed to the channel and feed the article and wrapper so wrapped to the bight of the movable and stationary parts of the channel. This operation allows the wrapper as it starts to roll around the article, to pinch one of its ends against the article while the other end is being rolled thereon.

Referring to Figs. 1, 2, and 4, a belt 20 drives the shaft $a$. The driving-pulley is loose on the shaft $a$ and may be fixed thereto to drive the same by means of a clutch $c$ operable by a rod $b$ passing through the hollow shaft 21. When the shaft $a$ is rotated, a gear thereon, shown in Figs. 3 and 4, through an intermediate gear, drives the gear 22 on the shaft $e$ (see Fig. 3). This shaft $e$ has thereon a pulley around which a belt travels, which also passes around a pulley on an idle-shaft 23, for a purpose to be described. The intermediate gear between shafts $a$ and $e$ is mounted on the hollow shaft 21 on which two sprockets are keyed (see Fig. 4). These sprockets drive a double connected chain 2 which passes around idle-sprockets on shafts 3 and 4 (see Fig. 3), for a purpose to be described. The shaft $h$ is driven from the shaft $a$ by the means shown in Fig. 4. A sprocket on shaft 21 carries a chain which passes around another sprocket on shaft $c'$. A bevel-gear on this shaft (see Figs. 1 and 4) drives the shaft $q$ on which is fixed the cam $m$. From the shaft $q$ bevel-gearing drives the shaft $f$, which, in turn, by bevel-gears, drives the paper-feeding rolls mounted on shafts $h$, $h^1$, $q$ and $q^1$.

The operation of the machine as driven from shaft $a$ is as follows: Stick-candy or similar articles (see Fig. 3) are fed down the feed-chute 1 so that the bottom stick rests on an insert of rubber in the horizontal table 11. The double connected chain 2 is mounted directly under this table 11 and this chain carries operating-fingers 6 on the cross-bars 15 (see Fig. 4) pivoted at intervals along and across the pivot points of the chain, as more clearly shown in Figs. 1 and 3. The wrapping-paper is fed transversely of the table 11 along the guide 12. The fingers 6 operate to engage the lower stick in the feed-chute 1 and push the same against the wrapping-paper which is held in the guide 12, and as the stick engages the paper just below the center line thereof a substantially U-shaped fold is made around the stick with the edges extending rearwardly (see Figs. 3 and 8). The fingers 6, as the chain operates, push the candy and wrapper along the table 11 and under the pressure-member 24. The fingers 6 normally occupy the position shown in the lower travel of the chain in Fig. 3. Each cross-set, in this case consisting of three fingers 6, has a spring 16, as shown in Fig. 1, operating to maintain the fingers in the normal position shown in Fig. 3. As these fingers start on their upward and outward travel through the machine, a roller 76 on lug-extension 77 on each cross-bar 15 engages the surface of cam 7, which, by turning bar 15 against its spring, moves the upper end of the fingers 6 against the candy and holds it thereagainst until the U-shaped fold above described has been made. A cut-away portion 8 in the cam 7 allows the springs to turn the cross-bars 15, and thus fingers 6, down and back away from the article, as shown in Fig. 3. The continued travel of the chain brings the roller 76 against the upper surface of the cam 7 again and causes the upper end of the fingers 6 to be again moved upwardly, but at this time the upper end of the fingers 6 has had sufficient longitudinal movement so that at this second upward travel it engages the short end of the substantially U-shaped fold of the wrapper and pushes this short lower end around the stick to be wrapped. The continued movement of the fingers 6, now with their upper end in the uppermost position, carries the stick and the wrapper under the belt 9. The movement of this belt causes the stick to roll along the table 11 and the longitudinal speed of this stick along the table 11 is slightly in excess of the longitudinal speed of the fingers 6, so that the long upper end of the U-shaped wrapper is now rolled around the stick and the stick, supported between the belt and the table 11, is rolled away from engagement with the fingers 6, all of which is clearly shown in the several views of the stick being wrapped in Figs. 3 and 9 to 11. As the articles are rolled through the channel, the fingers will straighten any article which does not roll straight. If an imperfect article, or broken stick of candy, or improper wrapper, is fed to the channel the fingers 6 will force the stick and wrapper to the outlet of the channel and prevent any clogging of the channel which would necessitate stopping the machine. The lower travel of the belt 9 is maintained in a horizontal position by a spring-pressed plate 14 which prevents the belt from sagging, due to the pressure of the belt against the stick. As each set of three fingers 6—the sets being mounted in series on the chains 2—passes under feed-chute 1, the operations just described are repeated continuously. As the stick is rolled between the belt and the table 11, the tubular ends are formed in the wrapper of each article. The machine is preferably so designed that this tubular end is sufficiently twisted at about the time that the stick leaves the fingers 6.

Arranged on each side of the table 11, as shown in Figs. 3, 5, and 6, are the plates (or other suitable parts to form a slot) 13 and 25. These plates, arranged one above the other, have a wedge-shaped slot formed therebetween, one at each side of the belt 9. As the tubular ends D (see Fig. 5) enter the wedge-shaped slots between the plates 13 and 25 at each side of the machine, the tubular end extension is crimped and flattened gradually as the tubular end passes into the wedge (see Fig. 3) and into the slot between the plates 13 and 25. This extension is twisted into the form F seen in Fig. 6. Since the width of the slots is maintained constant, the tubular end will not tear as the same is twisted, because the shortening of the tubular end, due to the twisting, will cause the slip of the paper through the slot, which will obviate any tendency to tear. After the ends of the wrapper are twisted at each end of the stick, they leave the slot between plates 13 and 25, passing out through the diverging ends of the slots, and the belt 9 then rolls the completely-wrapped articles to the end of the table 11, whereupon they roll down the discharge-table 10. It is to be understood that these slot-forming members as other parts of the machine, may be adjustably and removably mounted in obvious ways for mechanical convenience and setting. It is desired in this machine to obtain as great speed as possible because the output of a machine of this class is an extremely important item in its use. It will be noted from the description already given that the sticks are fed from the feed-chute 1 rapidly, one after the other, in a continuous path directly through the machine, each following those previously fed in rapid succession to the discharge-table 10. The fingers 6, which operate to feed the sticks from the feed-chute to the wrapping mechanisms, follow one after the other in a continuous operation so that no reciprocating feeding-plunger is necessary. A plunger may, however, be used, if desired. By means of the arrangement shown, very great speed can be obtained in passing the sticks through the machine. This necessitates a special form of paper-feeding device which can feed and cut the wrapping material fast enough and place the same in the right position to coöperate with the feeding of the sticks.

This paper-feed mechanism will now be described. Referring to Figs. 2 and 4, the wrapping-paper, in rolls, is placed on the shafts $i$, one on each side of the machine. The paper is then fed around the feed-rolls mounted on shafts $h$, $h^1$, $g$ and $g^1$, which are continuously driven in the manner already described from shaft $a$. From these rolls the paper is fed from each side of the machine along the paper-guide 12 mounted transversely of the table 11, as seen in Figs. 2 and 3. A transverse slot in the table 11 allows the paper to extend sufficiently below this table to properly position the paper with relation to the sticks as fed from chute 1. Paper-gripping jaws are arranged to grip the end of the paper, first from the roll on one side of the machine and pull the same across the path of the sticks fed along the table 11, and then from the other roll across the same path. This paper-gripping device is arranged as shown in Fig. 2. Two stationary grippers coöperate with two movable gripper-jaws on the arm $v$, which is pivoted on the slide $u$, and when this arm $v$ is turned in one direction a spring which will pass across centers will hold the lever $v$ in the position to which it is moved. The cam $m$, as seen in Fig. 4, operates through the link-members $r$, $s$, and $t$ to move the slide $u$ along the stationary transverse guide-member $x$. Another cam, back of the one shown but on the same cam-plate, operates through the link-members $n$ and $o$ to rock the members $p$ pivoted to the frame (see Fig. 1). A lever $y$ pivoted to the slide $u$ is fastened to the lever $v$ so that the movement of the lever $y$ operates to move the lever $v$. After the cam $m$ has moved the slide $u$ to its extreme left-hand position (see Figs. 2 and 4), the jaws at the left of the device $u$ will be in open position and allow the end of the paper supported by the guide 12 to pass therebetween. As soon as the paper is between the jaws of the gripping-device, the cam on the shaft $q$ operates the link-members $n$ and $o$ to rock the members $p$ (see Fig. 1). One of these members $p$ turns to rock the lever $y$ and causes the gripping-devices at the left in Fig. 2 to grip the paper, and the spring previously mentioned, passing across centers, holds the gripper in closed position. The cam $m$ then moves the slide $u$ to its extreme right-hand position, after which the link-members $n$ and $o$, being again operated by cam on shaft $q$, cause the gripper $v$ to release the paper from the left-hand roll in Fig. 2 and to grip the paper from the right-hand roll in said figure, whereupon the operation is repeated. Thus, as the member $u$ slides back and forth on the rod $z$, each cross-travel carries a suitable length of paper along the guides 12 across the path of the sticks fed along the table 11. It will thus be seen that no movement of the paper-feeding device is wasted, for at each movement the paper-gripping device is carrying paper from one roll and preparing to take it from the other roll for its return trip. This arrangement doubles the capacity of the paper-feeding device over what it would be in the ordinary reciprocating paper-gripper, which operates to pull the paper into place and then to return to again pull it into place. After the device $u$ has traveled from one extreme position to the other, it is necessary to cut the paper which has been fed from the roll. This is done by means of a movable knife coöperating with a stationary knife at the proper time, or by any other suitable form of knife. The movable knife $j$ (see Fig. 2) is mounted on a bell-crank lever and a spring (not shown) operates to cause the knife to turn into cutting position. This turning into cutting position is prevented by means of a roller on the lower end of the bell-crank lever bearing against the under surface of the feed-rollers $h$ and $g$. At the proper time a cut-away portion $k$ in this under surface allows the spring to throw the roller into portion $k$ and the movable knife against the stationary knife to cut the paper. Whenever it is desired to turn the machine to adjust the same by hand, the hand-wheel 30 (see Fig. 2) can operate all the driving mechanisms previously described.

While applicant has chosen to show, for purposes of illustrating his invention, a specific embodiment of a preferred form, it is to be understood that many features of the invention may be changed considerably from the specific form shown without departing from the invention. For example, the members forming the wedge-shaped slots may be rotated after the tubular ends have been wedged in the slots to twist the ends, rather than rotating the article and keeping the slot-forming members stationary. Such a modification could be applied to existing twist-end wrapping machines by substituting the slot-forming members for the opening-and-closing twisting jaws now in use. The machine shown could readily be adapted for feeding two or more articles in line and side by side to the feeding-belt; that is to say, a bank arrangement of the machine.

That which I claim as my invention, and desire to secure by Letters Patent, is,—

1. In a wrapping-machine, the combination of a feed chute; a horizontal table arranged to receive articles to be wrapped, a horizontally-operable conveyer-belt mounted parallel to the table to convey the articles thereacross, a paper-feeding device arranged to feed wrapping material transversely of the table between said feed-chute and the conveyer-belt, devices arranged to move articles from said feed-chute against the wrapping paper and between the belt and the table, all constructed and arranged so that the travel of the belt will roll the article along the table and at the same time wrap the paper around the article completely in one direction.

2. In a wrapping-machine, the combination of a feed-chute, a horizontal table, a conveyer-belt mounted to run horizontally and parallel to the table to convey the articles therealong, sheet-feeding devices arranged to feed sheets of wrapping material transversely of the table between the outlet of the feed-chute and the belt, carrying-means operable to move each article from the feed-chute against the wrapping sheet and between the belt and table, including means to partially form the wrapper around the article, whereby as the article is fed between the belt and the table the travel of the belt will roll the wrapping material around the article, end-twisting devices arranged one on each side of the belt to twist the tubular ends of the articles as they pass along the table to the discharge end of the machine.

3. In a wrapping-machine, the combination of a horizontal table, a feed chute, a conveyer-belt mounted to travel horizontally a fixed distance from and parallel to the table, paper-feeding devices arranged to form and feed sheets of wrapping material between the feed-chute and the horizontally-traveling belt, conveying-means to move articles to be wrapped against the wrapping material fed transversely of the table and into a folding slot, whereby the article is partially wrapped, comprising means to tuck one end of the wrapper partially around the article and to thereafter then feed the article and its wrapper between the horizontally-traveling belt and the table, whereby the travel of the belt will roll the article along the table and completely wrap it in one direction, twist-end forming-devices arranged one on each side of the belt operable to twist the ends of the wrapping material against the ends of the articles as the latter pass along the table.

4. A wrapping-machine, comprising, in combination, a feed-chute, a table, a belt-conveyer mounted to move parallel to the table, paper-feeding means to feed wrapping-paper transversely between the chute and the belt conveyer, feeding and tucking devices arranged to move the articles from the chute against the paper, tuck the paper partly around the article, and feed the partially-wrapped article between the belt and the table, whereby the movement of the belt will roll the articles on the table and complete the wrapping of the articles in the direction of rotation.

5. In a wrapping-machine, the combination of a conveyer for the articles to be wrapped, means associated therewith for wrapping the article completely in one direction so as to leave tubular end extensions in the wrapper, together with end-twisting devices arranged to twist the tubular end extensions, comprising two sets of relatively fixed slot-forming members, one on each side of said conveyer, arranged to maintain a slot of fixed width less than the diameter of the tubular end extensions to be twisted but having an entrance of sufficient width to admit said extension longitudinally of the slot, whereby when the tubular end extension is placed in the slot it is thereby flattened or crimped so that the wrapper may be twisted against the end of the article by a relative rotation between said devices and the article.

6. In a wrapping-machine, the combination of a member having a wrapping surface, a belt-conveyer mounted to travel parallel to and at a fixed distance from said surface, feeding means arranged to feed articles partially wrapped in one direction between said belt and surface, whereby the belt may roll the article to complete the wrapping in one direction while conveying the article along the surface, together with end-twisting devices arranged to twist the tubular end extensions, comprising two sets of relatively fixed slot-forming members, one on each side of said conveyer, arranged to maintain a slot of fixed width less than the diameter of the tubular end extensions to be twisted but having an entrance of sufficient width to admit said extension longitudinally of the slot, whereby when the tubular end extension is placed in the slot it is thereby flattened or crimped so that the wrapper may be twisted against the end of the article by a relative rotation between said devices and the article, said rotation being obtained by the rolling movement given to the article by the belt-conveyer.

7. In a wrapping-machine, the combination of a conveyer for the articles to be wrapped, driving means to continuously move said conveyer, means associated therewith for wrapping the article completely in one direction so as to leave tubular end extensions in the wrapper, together with end-twisting devices arranged to twist the tubular end extensions, comprising two sets of relatively fixed slot-forming members, one on each side of said conveyer, arranged to maintain a slot of fixed width less than the diameter of the tubular end extensions to be twisted but having an entrance of sufficient width to admit said extension longitudinally of the slot, whereby when the tubular end extension is placed in the slot it is thereby flattened or crimped so that the wrapper may be twisted against the end of the article by a relative rotation between said devices and the article.

8. In a wrapping-machine, the combination with a wrapping-table having a wrapping-channel thereon, of a feed-chute arranged to automatically feed articles to the table, a paper-feed device, and means to operate the same to feed wrapping material transversely and perpendicular to the table, an endless conveying means mounted on one side of the table with devices thereon movable through the wrapping channel to convey the articles along the table from the feed-chute and against the wrapping material into the wrapping-channel, whereby the article is partially wrapped, a second endless conveying means mounted on the opposite side of the table from the first and forming with the table an extension of said wrapping-channel, said devices on the first conveyer adapted to feed the articles along the channel to a position between the second conveyer and the table, means arranged in the path of said devices to coöperate therewith to partially wrap the wrapping material farther around the article in the last-mentioned feeding movement, driving-means for said second conveyer to move the same parallel to the table and completely roll the wrapper around each article by rolling the article and the wrapper along the table through the channel, and end-twisting devices arranged one on each side of said channel to twist the ends of the wrapping material to complete the wrapping as the articles pass through the channel, all for the purpose described.

9. In a wrapping-machine, the combination with a wrapping-table having a wrapping-channel thereon, of a feed-chute arranged to automatically feed articles to the table, a paper-feed device, and means to operate the same to feed wrapping material transversely and perpendicular to the table, an endless conveying means mounted on one side of the table with devices thereon movable through the wrapping channel to convey the articles along the table from the feed-chute and against the wrapping material into the wrapping-channel, whereby the article is partially wrapped, a second endless conveying means mounted on the opposite side of the table from the first and forming with the table an extension of said wrapping-channel, said devices on the first conveyer adapted to feed the articles along the channel to a position between the second conveyer and the table, means arranged in the path of said devices to coöperate therewith to partially wrap the wrapping material farther around the article in the last-mentioned feeding movement, and driving means for said second conveyer to move the same parallel to the table and completely roll the wrapper around each article by rolling the article and the wrapper along the table through the channel, all for the purpose described.

10. In a wrapping machine, a plurality of stationary slot-forming members, comprising a pair of such members arranged upon each side of the article to be wrapped, and each pair so constructed as to afford a fixed smooth-faced slot having a converging entrance and an exit whereby as an article and its wrapper are rolled through said slot the wrapper may be twisted to form tubular extensions at each end thereof.

11. In a wrapping machine through which the article to be wrapped is passed, a kiss twister comprising a pair of slot-forming members, each member of the pair being fixed relatively to the other, said members being arranged adjacent the path of travel of the partially-wrapped article in the machine, and said members being so constructed as to afford therebetween a slot having a converging entrance, all for the purpose described, and means for rolling the article along adjacent said members so that the wrapper of the article may pass through the slot.

12. In a wrapping machine, the combination of devices to form a wrapping channel, a part of which is movable to roll cylindrical articles therethrough, devices to successively feed cylindrical articles and wrapping material in position to be passed into said channel, together with a series of fingers, and means to operate the latter to partially pass the wrapping material around each article and feed it and the wrapping material into the channel and follow the article as the latter is rolled through the channel to keep the latter clear and properly insure the passage of the article therethrough.

13. In a wrapping machine, the combination, of devices to form a wrapping channel, a part of which is movable to roll cylindrical articles therethrough, devices to successively feed cylindrical articles and wrappers therefor in position to be passed into said channel, together with a group of fingers constructed and arranged to successively feed each article and its wrapper in proper relative position to the channel and follow it therethrough as the wrapper is rolled around the article to insure its proper passage and keep the channel clear for following articles.

AUGUST V. LINCOLN.

Witnesses:
F. G. NEAL,
K. I. CLEMONS.